United States Patent [19]
Okada et al.

[11] Patent Number: 6,068,452
[45] Date of Patent: May 30, 2000

[54] TORQUE LIMITING MECHANISM

[75] Inventors: Masahiko Okada; Takashi Ban; Nobuaki Hoshino; Takanori Okabe, all of Kariya, Japan

[73] Assignee: Kabushiki Kaisha Toyoda Jidoshokki Seisakusho, Kariya, Japan

[21] Appl. No.: 09/040,290

[22] Filed: Mar. 17, 1998

[30] Foreign Application Priority Data

Mar. 21, 1997 [JP] Japan .................................. 9-068190

[51] Int. Cl.[7] .................................................. F04B 49/00
[52] U.S. Cl. .............................. 417/223; 417/319; 403/2; 464/32
[58] Field of Search .................................. 417/219, 223, 417/362, 364; 464/30, 32, 33; 403/2; 192/56 R

[56] References Cited

U.S. PATENT DOCUMENTS

| | | | |
|---|---|---|---|
| 4,705,421 | 11/1987 | Depping | 403/2 |
| 4,859,156 | 8/1989 | Kikuchi | 417/319 |
| 5,443,372 | 8/1995 | Kanoll | 417/319 |
| 5,800,137 | 9/1998 | Eital et al. | 417/319 |

FOREIGN PATENT DOCUMENTS

| | | |
|---|---|---|
| 0 254 295 A1 | 1/1988 | European Pat. Off. . |
| PS 351 502 | 4/1922 | Germany . |
| OS 20 56 993 | 5/1972 | Germany . |
| AS 22 36 856 | 2/1974 | Germany . |
| 63-19083 | 2/1988 | Japan . |
| 2 014 704 | 8/1979 | United Kingdom . |

*Primary Examiner*—John A. Jeffery
*Assistant Examiner*—Leonid Fastovsky
*Attorney, Agent, or Firm*—Woodcock Washburn Kurtz Mackiewicz & Norris LLP

[57] ABSTRACT

A torque limiting apparatus is located between a power source and a driven apparatus. A number of breakable power transmission members connect a drive rotor to a driven rotor. The breakable members are fractured to disconnect the driven rotor from the drive rotor when the load applied by the driven apparatus exceeds a predetermined value. A promoting member is located near at least one of the power transmission members for promoting breakage when the load causes the driven rotor to rotate relative to the drive rotor. The breakable members are broken consecutively. The breakable members are not significantly affected by fatigue.

17 Claims, 5 Drawing Sheets

TORQUE LIMITING MECHANISM

BACKGROUND OF THE INVENTION

The present invention relates to torque limiting mechanisms that transmit rotational power from an external power source to a driven apparatus.

A typical driven apparatus is directly coupled to a power source such as an electric motor or an engine and is driven by the power source. A torque limiting mechanism is sometimes located between the driven apparatus and the drive source. The torque limiting mechanism forcibly disengages the power source from the driven apparatus when a malfunction occurs in the driven apparatus, for example, when the apparatus is locked. That is, the mechanism prevents the power source from being affected by an excessive load torque due to the malfunction in the driven apparatus. Japanese Unexamined Utility Model Publication No. 63-19083 discloses an on-vehicle clutchless type compressor having such a torque limiting mechanism. The compressor has a rotary shaft and receives power of an engine through a pulley, which is coupled to the engine, and the rotary shaft. That is, a power receiver is press fitted to the rotary shaft. A pair of breakable pins project from the receiver. The pins are engaged with holes formed in the pulley. The pins are designed to simultaneously break when they receive an excessive load torque applied by the compressor. This disengages the pulley from the rotary shaft. Accordingly, the pulley goes into a freewheeling condition. The engine is thus not affected by the excessive load torque.

In the above prior art mechanism, it is difficult to improve both the fatigue strength of the pins and the predictability of the value of load torque at which the pins are broken. The load torque at which the pins are broken is determined by calculation. However, the pins are weakened by torque fluctuations that are smaller than the calculated breakage torque. Weakening of the pins eventually causes the pins to be broken by a load torque that is smaller than the calculated breakage torque. When the compressor is either turned on or off, the pulley rapidly applies torque to the pins. This accelerates the fatigue of the pins.

Further, since the pins are designed to be broken simultaneously, the breakage strength of each pin needs to be half the calculated breakage torque. This causes each pin to be more vulnerable to fatigue. As a result, the pins are more likely to be broken by a load torque that is smaller than the calculated breakage torque.

Although two or more breakable pins are usually used in the above mechanism, some mechanisms have a single breakable pin. In this case, the diameter of the pin is not necessarily small. However, as in the case of a mechanism having multiple pins, the single pin is fatigued by repeated torque fluctuations and is eventually broken by a load torque that is smaller than the calculated breakage torque.

SUMMARY OF THE INVENTION

Accordingly, it is an objective of the present invention to provide a torque limiting mechanism that prevents a power transmission member from being weakened during normal operation of a driven apparatus and breaks the power transmission member immediately when the load torque reaches a predetermined value due to a malfunction in the driven apparatus thereby disengaging a power source from the driven apparatus.

To achieve the foregoing and other objectives and in accordance with the purpose of the present invention, a torque limiting apparatus for transmitting power supplied from a power source to a driven apparatus is provided. The apparatus includes a drive rotor powered by the power source and a driven rotor that is driven by the drive rotor under normal conditions. The driven rotor is connected to the driven apparatus such that the driven rotor delivers power to and receives load torque from the driven apparatus. The apparatus also includes power transmission members and a breakage promoting member. The power transmission members join the driven rotor to the drive rotor. The power transmission members are broken to disconnect the drive rotor from the driven rotor when the load torque of the driven apparatus exceeds a predetermined value. The breakage promoting member is positioned to contact a first one of the power transmission members when the load torque applied between the drive rotor and the driven rotor exceeds the predetermined value causing the drive rotor to rotate relative to the driven rotor. The contact promotes breakage of the first power transmission member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A torque limiting mechanism according to a first embodiment of the present invention will now be described with reference to FIGS. 1 to 7. The mechanism is used with an on-vehicle accessory such as a clutchless type compressor. A clutchless type compressor refers to a compressor that has no clutch between its rotary shaft and a pulley that couples the compressor to a power source.

Figure 1:
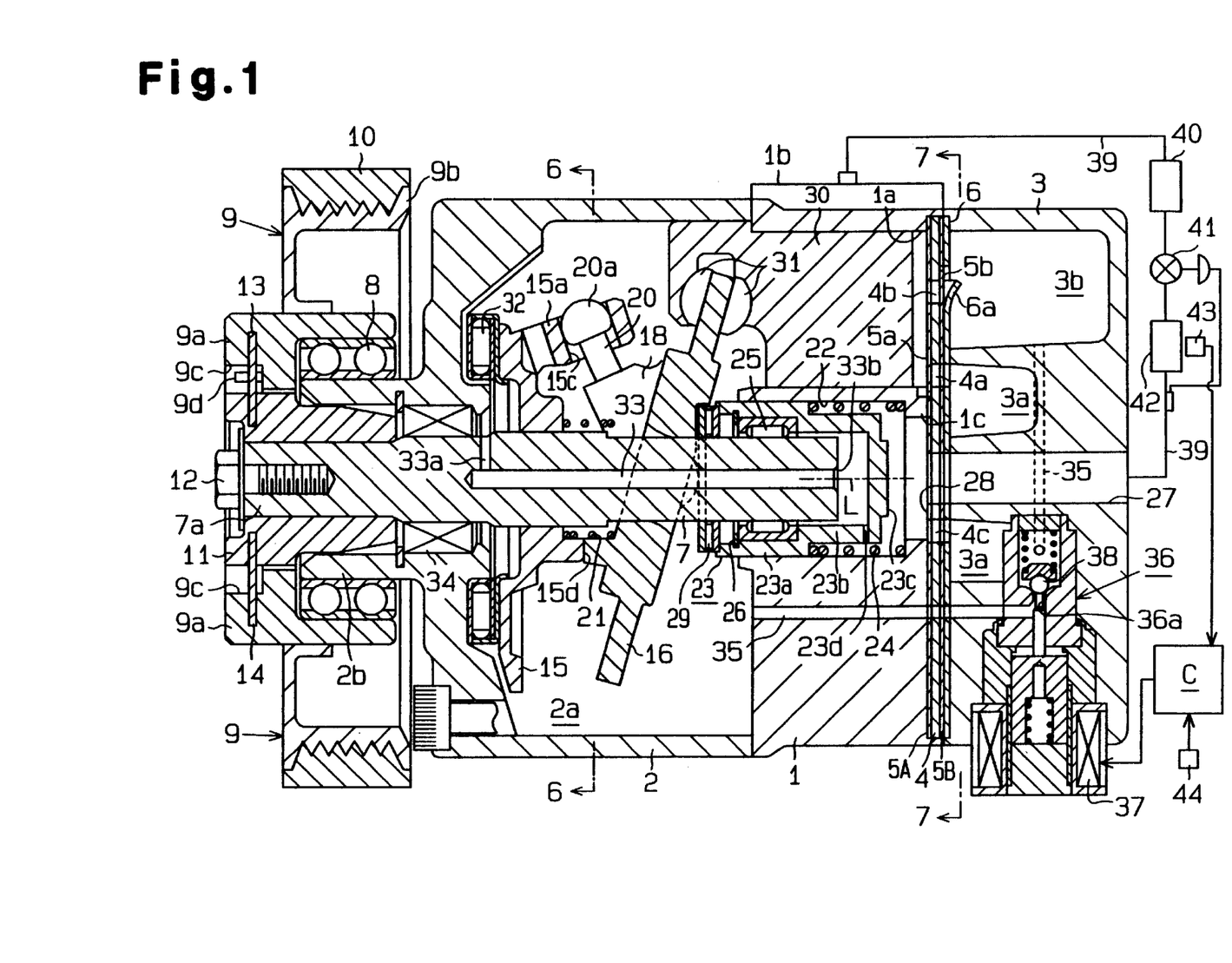
FIG. 1 is a cross-sectional view illustrating a compressor according to one embodiment of the present invention.

As shown in FIG. 1, a front housing 2 is secured to the front end face of a cylinder block 1, or a center housing. A rear housing 3 is secured to the rear end face of the cylinder block 1 with a valve plate 4, two valve flap plates 5A, 5B and a retainer plate 6 in between. The front housing 2 and the cylinder block 1 define a crank chamber 2a. A rotary shaft 7 is rotatably supported in the crank chamber 2a. A lip seal 34 is located between the rotary shaft 7 and the front housing 2 for sealing the crank chamber 2a. A front end portion 7a of the rotary shaft 7 protrudes from the crank chamber 2a and is screwed to a bushing 11, or a driven rotor. Further, the bushing 11 is secured to the shaft 7 by a bolt 12. The bushing 11 therefore integrally rotates with the rotary shaft 7.

The front housing 2 has a cylindrical wall 2b extending axially from its front end. An angular bearing 8 is fitted about the cylindrical wall 2b. The angular bearing 8 slides axially and receives axial and radial loads. A pulley 9, or a drive rotor, is secured to the bearing 8. Specifically, the pulley 9 includes a connector ring 9a and a pulley body 9b. The connector ring 9a is secured to the outer ring of the bearing 8 and has a circular opening at the center, through which the bushing 11 extends. The pulley body 9b is press fitted to the connector ring 9a and is coupled to a vehicle engine (not shown), or an external power source, by a belt 10.

As shown in FIG. 2(a), a step is formed in the distal end (in the upper end as viewed in FIG. 2(a)) of the center opening of the ring 9a. The step, together with the corresponding part of the bushing 11, defines an annular space 9f, which is defined by an outer cylindrical wall 9c and an inner cylindrical wall 9e of the ring 9a, or inner surfaces of the ring 9a. The distance between the outer wall 9c and the axis L of the rotary shaft 7, or the radius of the outer wall 9c, is referred to as R1. The distance between the inner wall and the axis L, or the radius of the inner wall 9e, is referred to as R2.

The radius of the bushing 11 is slightly smaller than the radius R2. Therefore, a clearance C1 is defined between an outer surface of the bushing 11 and the inner surface of the connector ring 9a as illustrated in FIGS. 2(a) and 2(b). An annular radial wall, which is perpendicular to the axis L, intersects the outer wall 9c.

First and second breakable metal wires 13 and 14, or power transmission members, are located in the space 9f. The wires 13, 14 extend radially and are located on opposite sides of the rotary shaft 7. The wires 13, 14 are designed to be broken when an excessive load is applied by the compressor. The first and second wires 13 and 14 couple the bushing 11 with the connector ring 9a at opposite locations with respect to the shaft 7. The power of the engine is transmitted to the on-vehicle clutchless type compressor as the driven apparatus by the pulley 9 and the first and second wires 13, 14.

Further, a pin 9d, or a breakage promoter, is located in the annular radial wall of the connector ring 9a as shown in FIGS. 2(a) and 2(b). The pin 9d extends parallel to the axis L of the rotary shaft 7. Therefore, as shown in FIG. 2(a), the pin 9d is perpendicular to the first wire 13. Also, as shown in FIG. 2(b), the pin 9d is located in the vicinity of the first wire 13. Specifically, the pin 9d is located on the trailing side of the first wire 13 with respect to the rotational direction of the pulley 9. Thus, when the pulley 9 is rotated, the pin 9d follows the wire 13.

Figure 6:
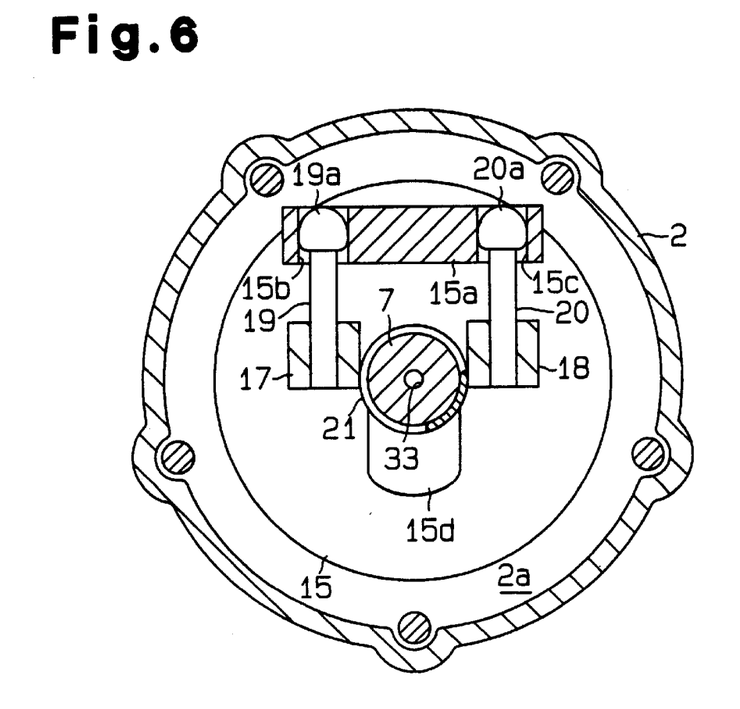
FIG. 6 is a cross-sectional view taken along line 6—6 of FIG. 1.

The crank chamber 2a accommodates a lug plate 15 and a swash plate 16. The lug plate 15 is fixed to the rotary shaft 7. The swash plate 16 is supported on the shaft 7 to slide along and tilt with respect to the axis L of the rotary shaft 7. As shown in FIG. 6, the swash plate 16 has a pair of supports 17, 18. A pair of guide pins 19, 20 are fixed to the supports 17, 18. The guide pins 19, 20 have guide balls 19a, 20a at the distal ends. The lug plate 15 has a protruding support arm 15a. A pair of guide holes 15b, 15c are formed in the support arm 15a. The guide balls 19a, 20a are slidably fitted in the guide holes 15b, 15c. Cooperation of the support arm 15a and the guide pins 19, 20 allows the swash plate 16 to rotate integrally with the rotary shaft 7. The cooperation also allows the swash plate 16 to slide along and to tilt with respect to the axis L of the rotary shaft 7. The tilting motion of the swash plate 16 is guided by sliding of the guide balls 19a, 20a in the guide holes 15b, 15c and by sliding of the swash plate 16 on the rotary shaft 7. As the center of the swash plate 16 moves toward the cylinder block 1, the inclination of the swash plate 16 decreases.

A spring 21 extends between the lug plate 15 and the swash plate 16. The spring 21 urges the swash plate 16 in the direction (to the right as viewed in FIG. 1) to decrease the inclination of the swash plate 16. The abutment of a part of the swash plate 16 against a stopper 15d formed on the lug plate 15 limits the maximum inclination of the swash plate 16.

The cylinder block 1 has a shutter chamber 22 at its center. The rear housing 3 has a suction passage 27 at its center. The shutter chamber 22 extends along the axis L of the rotary shaft 7 and communicates with the suction passage 27. A cylindrical shutter 23 is slidably accommodated in the shutter chamber 22. The axis of the shutter 23 is aligned with the axis L of the rotary shaft 7. The shutter 23 has a large diameter portion 23a and a small diameter portion 23b. The diameter of the large diameter portion 23a corresponds to that of the shutter chamber 22 and the diameter of the small diameter portion 23b is smaller than that of the large diameter portion 23a. A coating is applied to the large diameter portion 23a for reducing friction between the sliding of the shutter 23 and the shutter chamber 22. The coating is made of, for example, a resin such as polytetrafluoroethylene (PTFE).

A step 1c is formed in the rear end of the shutter chamber 22. A spring 24 extends between the step 1c and a step on the shutter 23, which is formed by the large diameter portion 23a and the small diameter portion 23b. The spring 24 urges the shutter 23 in a direction opening the suction passage 27. In other words, the spring 24 pushes the rear face, or a shutting surface 23c, of the shutter 23 away from the valve flap plate 5A thereby urging the shutter 23 toward the swash plate 16.

The rear end of the rotary shaft 7 is slidably inserted in the shutter 23. A radial bearing 25 is fixed to the inner wall of the large diameter portion 23a by a snap ring 26. The rear end of the rotary shaft 7 is supported by the inner wall of the shutter chamber 22 with the radial bearing 25 and the shutter 23 in between. The radial bearing 25 slides with the shutter 23 along the rotary shaft 16.

Figure 7:
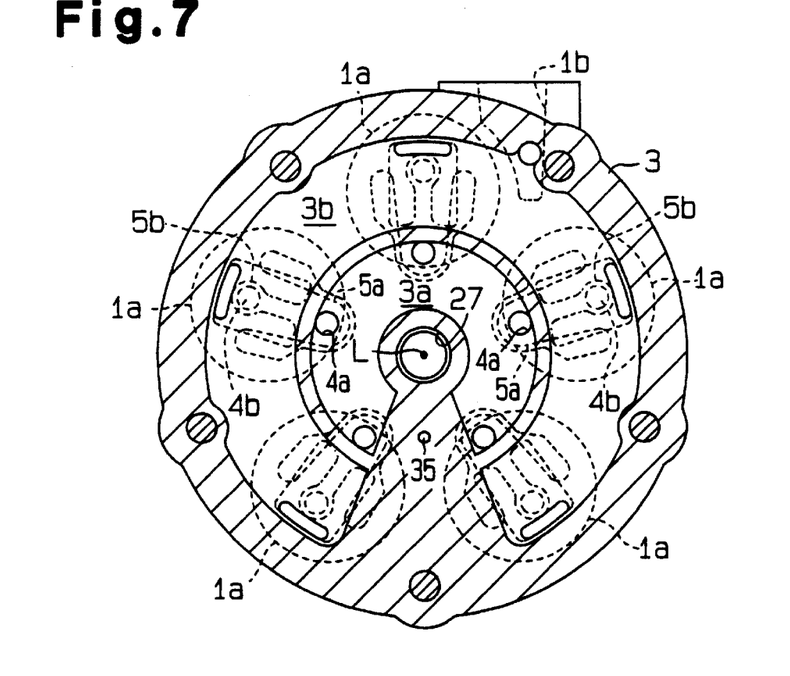
FIG. 7 is a cross-sectional view taken along line 7—7 of FIG. 1.

As shown in FIG. 7, the suction passage 27 has a circular cross-section and its axis is aligned with the axis L of the rotary shaft 7. As described above, the suction passage 27 communicates with the shutter chamber 22. A positioning surface 28 is formed on the valve plate 5A about the inner opening of the suction passage 27. The shutting surface 23c of the shutter 23 abuts against the positioning surface 28. Abutment of the shutting surface 23c against the positioning surface 28 prevents the shutter 23 from further moving rearward (to the right as viewed in FIG. 1) away from the swash plate 16.

A thrust bearing 29 is supported on the rotary shaft 7 and is located between the swash plate 16 and the shutter 23. The swash plate 16 moves backward as its inclination decreases. As it moves backward, the swash plate 16 pushes the shutter 23 backward with the thrust bearing 29. Accordingly, the shutter 23 moves toward the positioning surface 28 against the force of the spring 24. The shutter 23 eventually contacts the positioning surface 28. The thrust bearing 29 prevents rotation of the swash plate 16 from being transmitted to the shutter 23. If the shutter 23 was rotated, the load torque of the compressor will increase. Especially, when the shutting surface 23c of the shutter 23 contacts the positioning surface 28, the load torque would greatly increase. In short, the thrust bearing 29 prevents the load torque from increasing.

The cylinder block 1 has cylinder bores 1a extending therethrough. Each cylinder bore 1a houses a single-headed piston 30. The rotating movement of the swash plate 16 is transmitted to each piston 30 through a pair of shoes 31 and is converted to linear reciprocation of each piston 30 in the associated cylinder bore 1a.

As shown in FIGS. 1 and 7, an annular suction chamber 3a and an annular discharge chamber 3b are defined in the rear housing 3. The suction chamber 3a serves as a suction pressure area, while the discharge chamber 3b serves as a discharge pressure area. The valve plate 4 has suction ports 4a and discharge ports 4b. The valve flap plate 5A has suction valve flaps 5a and the valve flap plate 5B has discharge valve flaps 5b. As each piston 30 moves from the top dead center to the bottom dead center in the associated cylinder bore 1a, refrigerant gas in the suction chamber 3a enters the cylinder bore 1a through the associated suction port 4a while causing the associated suction valve flap 5a to flex to an open position. As each piston 30 moves from the bottom dead center to the top dead center in the associated cylinder bore 1a, refrigerant gas is discharged to the discharge chamber 3b through the associated discharge port 4b while causing the associated discharge valve flap 5b to flex to an open position. Retainers 6a are formed on the retainer plate 6. Each retainer 6a corresponds to one of the discharge valve flaps 5b. The opening amount of each discharge valve flap 5b is defined by contact between the valve flap 5b and the associated retainer 6a.

A thrust bearing 32 is located between the front housing 2 and the lug plate 15. The thrust bearing 32 carries the reactive force of gas compression that acts on the lug plate 15 through the pistons 30, the shoes 31, the swash plate 16, the supports 17, 18 and the guide pins 19, 20.

The suction chamber 3a is connected with the shutter chamber 22 by a communication hole 4a. When the shutting surface 23c of the shutter 23 contacts the positioning surface 28, the communication hole 4a is disconnected from the suction passage 27.

The rotary shaft 7 includes a passage 33 extending along its axis L. The passage 33 has an inlet 33a, which opens to the crank chamber 2a in the vicinity of the lip seal 34, and an outlet 33b that opens in the interior of the shutter 23. A pressure release hole 23d is formed in the wall of the small diameter portion 23b of the shutter 23. The hole 23d communicates the interior of the shutter 23 with the shutter chamber 22.

As shown in FIG. 1, a supply passage 35 is defined in the rear housing 3 and the cylinder block 1. The supply passage 35 communicates the discharge chamber 3b with the crank chamber 2a. An electromagnetic valve 36 is accommodated in the rear housing 3 midway in the supply passage 35. The valve 36 includes a valve hole 36a, a solenoid 37 and a valve body 38. When excited, the solenoid 37 causes the valve body 38 to close the valve hole 36a. When de-excited, the solenoid 37 causes the valve body 38 to open the valve hole 36a. In this manner, the electromagnetic valve 36 opens and closes the supply passage 35.

An outlet 1b is defined in the cylinder block 1 for discharging refrigerant gas in the discharge chamber 3b to the outside. The outlet 1b is connected to the suction passage 27, which introduces refrigerant gas to the suction chamber 3a, by an external refrigerant circuit 39. The external refrigerant circuit 39 includes a condenser 40, an automatic expansion valve 41 and an evaporator 42. The expansion valve 41 automatically controls the flow rate of refrigerant in accordance with the temperature of refrigerant gas at the outlet of the evaporator 42. A temperature sensor 43 is located in the vicinity of the evaporator 42. The temperature sensor 43 detects the temperature of the evaporator 42 and issues signals relating to the detected temperature to a controller C.

The controller C excites and de-excites the solenoid 37 of the electromagnetic valve 36 based on the temperature detected by the temperature sensor 43. The controller C is also connected to an air conditioner starting switch 44. When the switch 44 is on, the controller C de-excites the solenoid 37 if the temperature detected by the sensor 43 is equal to or lower than a predetermined temperature. A detected temperature that is equal to or lower than the predetermined temperature represents a frost forming state of the evaporator 42. The controller C also de-excites the solenoid when the switch 44 is turned off.

In the state of FIG. 1, the solenoid 37 is excited and causing the valve body 38 to close the supply passage 35. Therefore, highly pressurized gas in the discharge chamber 3b is not supplied to the crank chamber 2a. Refrigerant gas in the crank chamber 2a flows to the suction chamber 3a through the passage 33 and the pressure release hole 23d. Accordingly, the pressure in the crank chamber 2a approaches a lower pressure in the suction chamber 3a, or the suction pressure. The swash plate 16 is moved to the maximum inclination position. Eventually, the swash plate 16 is retained at the maximum inclination position and the compressor operates at maximum displacement. Since refrigerant gas in the crank chamber 2a passes through the inlet 33a located near the lip seal 34, lubricant in the gas lubricates the lip seal 34 and the rotary shaft 7 and improves the sealing between the lip seal 34 and the shaft 7.

If the compressor operates with the swash plate 16 at the maximum inclination when the cooling load is small, temperature of the evaporator 42 decreases to the frost forming temperature. The temperature sensor 43 sends signals regarding the temperature of the evaporator 42 to the controller C. If the temperature detected by the sensor 43 is equal to or lower than the predetermined temperature, the controller C de-excites the solenoid 37. When de-excited, the solenoid 37 causes the valve body 38 to open the supply passage 35 thereby connecting the discharge chamber 3b with the crank chamber 2a. The supply passage 35 then supplies highly pressurized refrigerant gas in the discharge chamber 3b to the crank chamber 2a thereby increasing the pressure in the crank chamber 2a. The increase in the crank chamber pressure moves the swash plate 16 to the minimum inclination position.

As the inclination of the swash plate 16 decreases from the maximum inclination, the swash plate 16 moves the shutter 23 toward the suction passage 27 along the rotary shaft 7 while shrinking the spring 24. The shutting surface 23c eventually contacts the positioning surface 28 and closes the suction passage 27. The controller C also de-excites the solenoid 37 for moving the swash plate 16 to the minimum inclination position when the switch 44 is turned off.

When the shutting surface 23c of the shutter contacts the positioning surface 28, the suction passage 27 is closed. This stops the flow of refrigerant gas from the refrigerant circuit 39 to the suction chamber 3*a*. Accordingly, the circulation of refrigerant in the circuit 39 is stopped. When the suction passage 27 is closed, the swash plate 16 is at the minimum inclination position. In this manner, the minimum inclination of the swash plate 16 is limited by contact between the shutting surface 23*c* of the shutter 23 and the positioning surface 28.

The minimum inclination of the swash plate 16 is slightly greater than zero degrees. The swash plate 16 is located at the minimum inclination position when the shutter 23 is at the closed position to disconnect the shutter chamber 22 from the suction passage 27. The swash plate 16 moves the shutter 23 between the closed position and an open position (for example, a position of FIG. 1), which is away from the closed position.

As described above, the minimum inclination of the swash plate 16 is greater than zero degrees. Therefore, even if the inclination of the swash plate 16 is minimum, refrigerant gas in the cylinder bores 1*a* is discharged to the discharge chamber 3*b*. Some of the refrigerant gas that enters the discharge chamber 3*b* from the cylinder bores 1*a* flows to the crank chamber 2*a* through the supply passage 35. The gas in the crank chamber 2*a* then flows into the suction chamber 3*a* through the passage 33 and the release hole 23*d*. The gas is then drawn into the cylinder bores 1*a* and discharged to the discharge chamber 3*b* by the pistons 30. That is, when the inclination of the swash plate 16 is minimum, refrigerant gas circulates within the compressor traveling through the discharge chamber 3*b*, or the discharge pressure area, the supply passage 35, the crank chamber 2*a*, the passage 33, the pressure release hole 23*d*, the suction chamber 3*a*, or the suction pressure area, and the cylinder bores 1*a*. The pressures in the discharge chamber 3*b*, the crank chamber 2*a* and the suction chamber 3*a* are different from one another. The circulation of refrigerant gas allows the lubricant oil contained in the gas to lubricate the moving parts of the compressor.

When the shutter 23 is at the closed position, an increase of the cooling load increases the temperature of the evaporator 42. If the temperature of the evaporator 42 detected by the sensor 43 exceeds the predetermined temperature, the controller C excites the solenoid 37. Accordingly, the solenoid causes the valve body 38 to close the supply passage 35. At this time, the pressure in the crank chamber 2*a* is released through the passage 33 and the pressure release hole 23*d*. The decreases of the crank chamber pressure separates the shutting surface 23*c* of the shutter 23 from the positioning surface 28. This gradually increases the opening area of the suction passage 27 thereby gradually increasing the amount of refrigerant gas that enters the suction chamber 3*a* from the suction passage 27. Thus, the amount of refrigerant gas drawn into the cylinder bores 1*a* from the suction chamber 3*a* is gradually increased. The displacement of the compressor gradually increases, accordingly. The discharge pressure of the compressor gradually increases and the torque for operating the compressor also gradually increases. In this manner, the torque of the compressor does not dramatically change in a short time when the displacement changes from the minimum to the maximum. This reduces the shock that accompanies load torque fluctuations.

Figure 2:
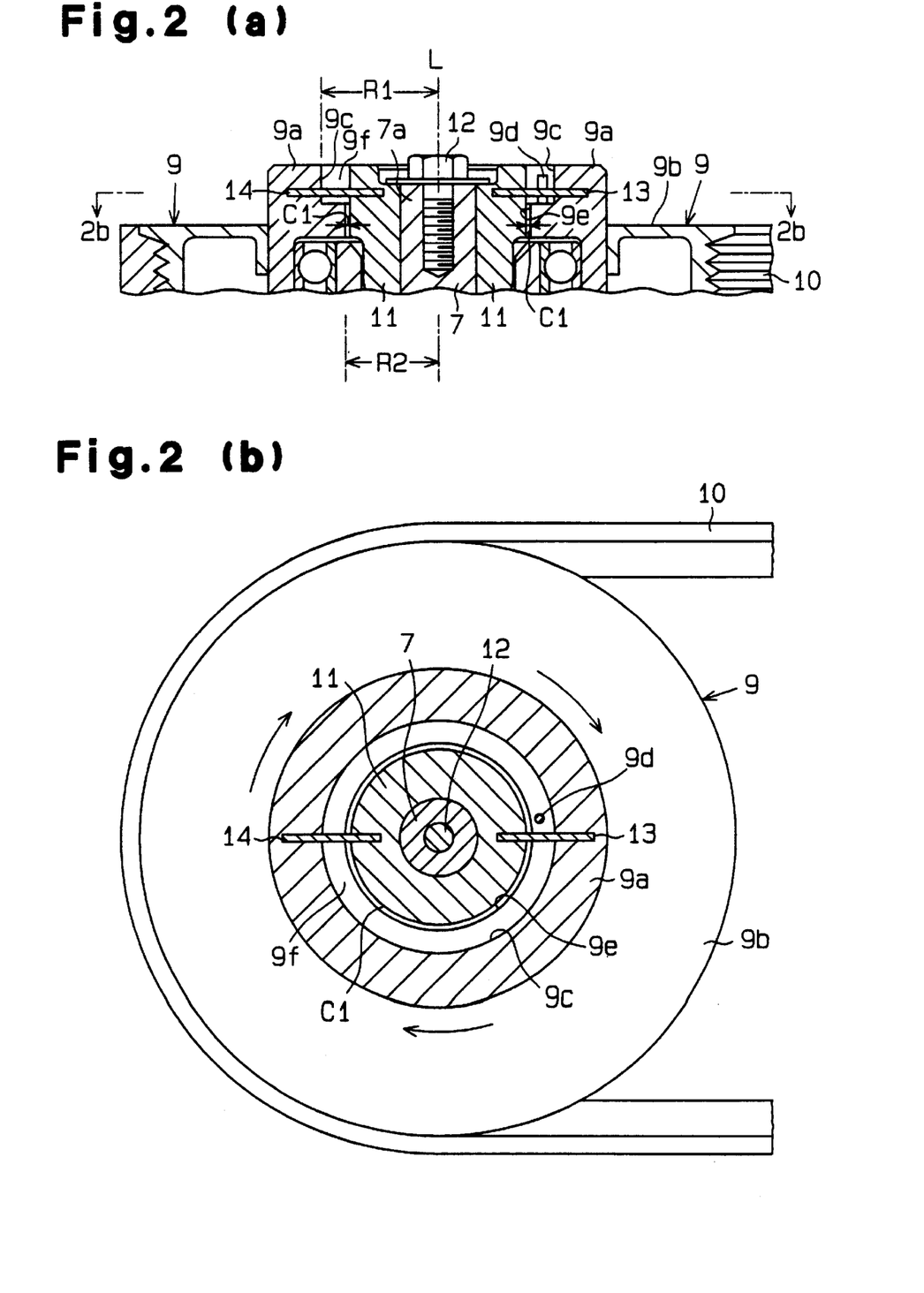
FIG. 2(a) is a partial cross-sectional view illustrating the torque limiting mechanism of the compressor of FIG. 1.
FIG. 2(b) is a cross-sectional view taken along line 2b—2b of FIG. 2(a)

When the compressor is operating at a normal state, load torque of the compressor is transmitted to the pulley 9 from the rotary shaft 7 by way of the bushing 11 and the first and second breakable wires 13, 14 as shown in FIGS. 2(*a*) and 2(*b*). When the compressor starts or stops operating, the load torque is fluctuated by changes of the displacement of the compressor. The load torque fluctuations are evenly received by the first and second wires 13, 14, and therefore do not fatigue the wires 13, 14.

Figure 3:
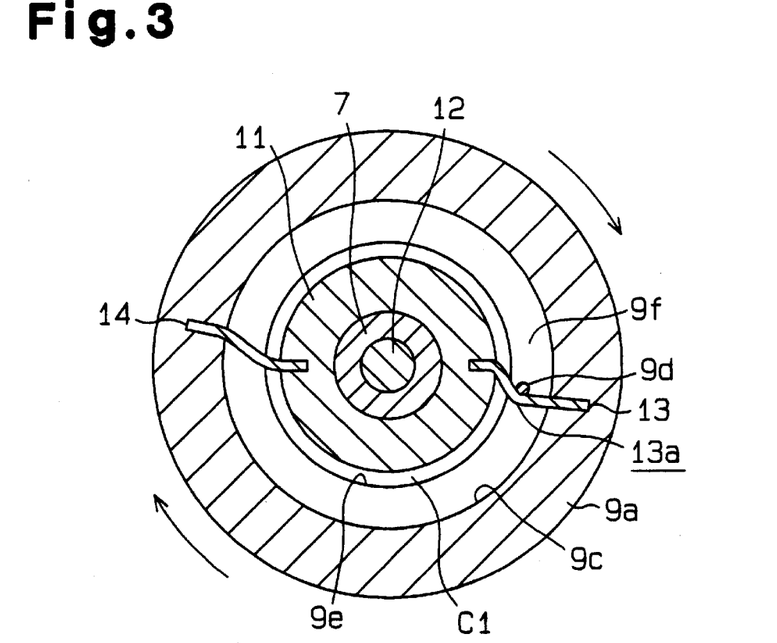
FIG. 3 is a partial cross-sectional view as seen from the same direction as FIG. 2(b) illustrating a breakage promoter contacting a breakable member.

A load torque that is greater than the predetermined value can stall the engine or break the belt 10. When an excessive torque is generated, the bushing 11 and the rotary shaft 7 resist the rotation of the pulley 9. Therefore, as shown in FIG. 3, the wires 13, 14 are deformed in the rotating direction of the pulley 9. As the deformation increases, the pin 9*d* penetrates the first wire 13 at a contact location 13*a*. That is, the first wire 13 is subjected to greater amount of stress than the second wire 14. The stress generated by the excessive load torque is greatest at the contact location 13*a*.

Figure 4:
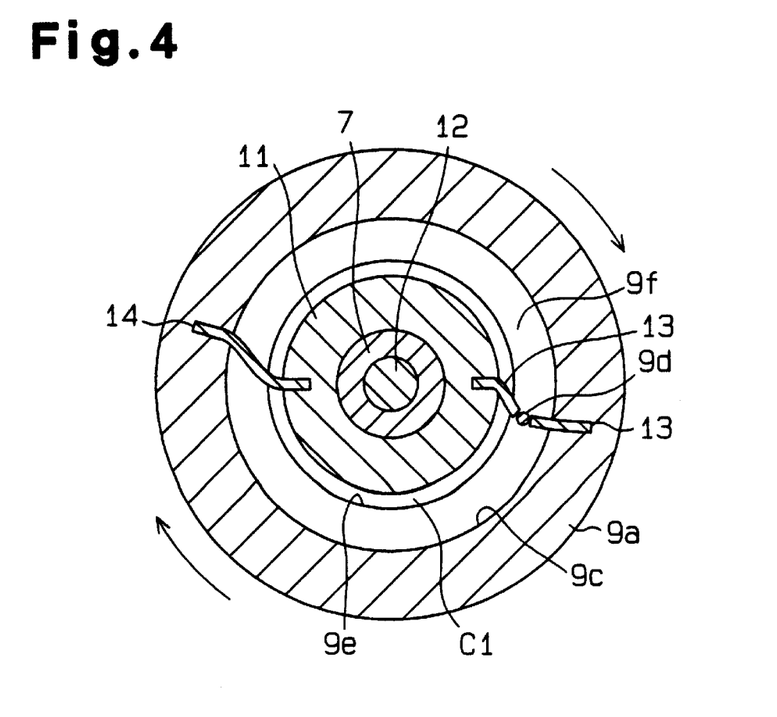
FIG. 4 is a cross-sectional view like FIG. 3 illustrating a broken breakable member.
Figure 5:
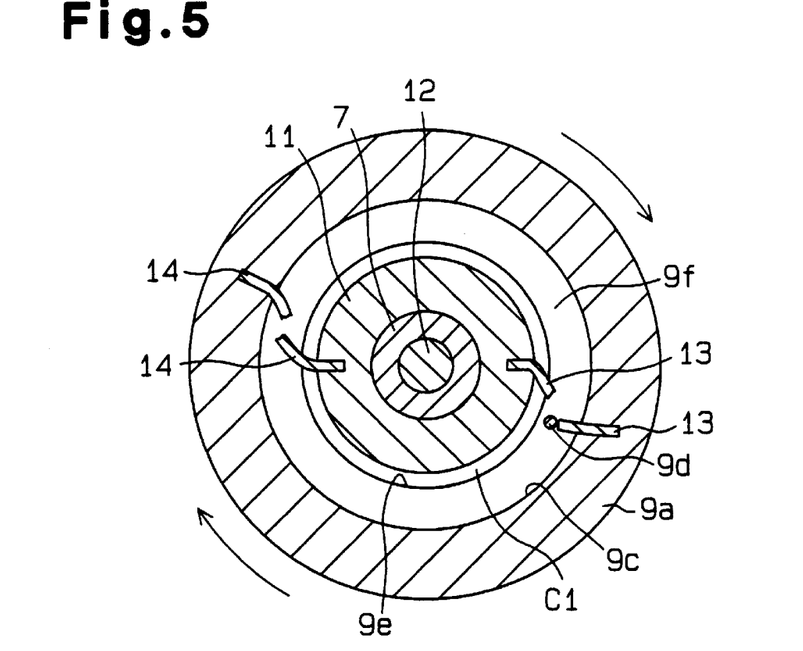
FIG. 5 is a cross-sectional view like FIG. 3 illustrating a drive rotor disengaged from a driven rotor.

If the force applied to the contact location 13*a* by the pin 9*d* causes the wire 13 to reach its stress limit, the pin 9*d* breaks the first wire 13 as shown in FIG. 4. As a result, the second wire 14 receives the excessive load torque alone and is stressed by a greater amount. The second wire 14 cannot bear the additional stress and breaks immediately after the first wire 13 breaks. In this manner, when the load torque reaches the predetermined value, the first and second wires 13, 14 consecutively break. Accordingly, the connector ring 9*a* is disconnected from the bushing 11 and the pulley 9 goes into a freewheeling condition.

The above embodiment has the following advantages.

When the load torque of the compressor exceeds a predetermine value, the pin 9*d* immediately breaks the first wire 13. Then, force is applied only to the second wire 14, which breaks the wire 14. In other words, when the load torque exceeds the predetermined value, the wires 13, 14 break immediately, and the excessive load torque is not transmitted to the pulley 9 from the rotary shaft 7. Therefore, the engine is not affected by the excessive torque and is not stalled by the excessive torque.

A breakage promoter (the pin 9*d*) is separately formed from the wires 13, 14 and the wires 13, 14 include no structure for promoting their breakage. Therefore, the wires 13, 14 are not weakened by load torque fluctuation that is smaller than the predetermined value. As long as there is no malfunction such as locking in the compressor, the wires 13, 14 never break due to fatigue.

If the wires 13, 14 are designed to break simultaneously, as in the prior art mechanism, the breakage strength of each of the wires 13, 14 needs to be relatively small. However, in this embodiment, the wires 13, 14 are designed to break consecutively. Therefore, the breakage strength of the wires 13, 14, which is determined, for example, by the diameter of the pin 9*d*, may be increased. This improves the life and reliability of the wires 13, 14 against fatigue due to torque fluctuations during the normal operation of the compressor.

The torque limiting mechanism of this embodiment includes the wires 13, 14 for coupling the connector ring 9*a* with the bushing 11. This construction is very simple and reduces the number of parts. Further, the wires 13, 14 need no special treatment and are easy to manufacture. Since the wires 13, 14 extend radially relative to the rotary shaft 7, the mechanism does not increase the axial size of the compressor, which conserves valuable space in the engine compartment of an automobile.

It should be apparent to those skilled in the art that the present invention may be embodied in many other specific forms without departing from the spirit or scope of the invention. Particularly, it should be understood that the invention may be embodied in the following forms.

Figure 8:
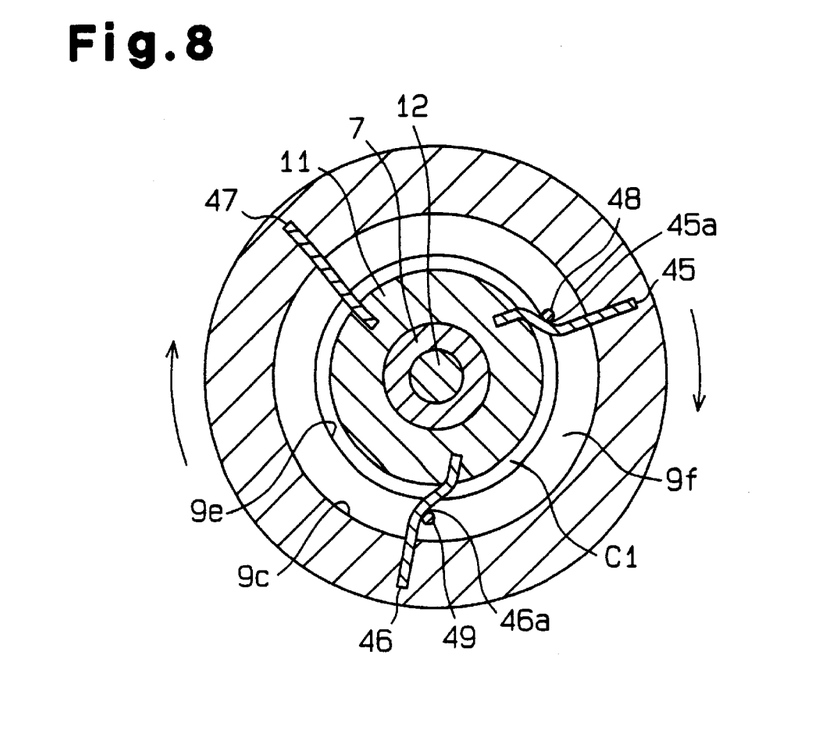
FIG. 8 is a cross-sectional view illustrating another embodiment of the present invention.

The connector ring 9*a* is coupled to the bushing 11 by two breakable wires. However, three or more breakable wires may be used. For example, as shown in FIG. 8, three breakable wires 45, 46, 47 may be used for coupling the ring 9a with the bushing 11. The wires 45, 46, 47 extend radially and are spaced apart at equal intervals. A first pin 48, or a breakage promoter, is provided in the radial wall of the space 9f and is located in the vicinity of the first wire 45. Specifically, the first pin 48 is located on the trailing side of the first wire 45 with respect to the rotating direction. The distance between the pin 48 and the outer wall 9c of the space 9f is greater than the distance between the pin 48 and the bushing 11 (inner wall 9e). Similarly, a second pin 49, or a breakage promoter, is provided in the radial wall of the space 9b and is located in the vicinity of the second wire 46. Specifically, the second pin 49 is located on the trailing side of the second wire 46 with respect to the rotating direction. The distance between the second pin 49 and the outer wall 9c is substantially equal to the distance between the second pin 49 and the bushing 11. The distance between the first wire 45 and the first pin 48 is less than the distance between the second wire 46 and the second pin 49.

When the load torque exceeds a predetermined value, the wires 45, 46, 47 are deformed in the rotating direction of the pulley 9 as illustrated in FIG. 8. Since the pins 48, 49 are located at different radial positions, the first and second pins 48, 49 contact the first and second wires 45, 46 at radially different positions. Specifically, the first pin 48 contacts the first wire 45 at a first contact location 45a and the second pin 49 contacts the second wire 46 at a second contact location 46a, which has a greater radius than the first contact location 45a. This causes the first pin 48 to deform the first wire 45 by a greater amount than the second wire 46 is deformed by the second pin 49. Further, since the distance between the first wire 45 and the first pin 48 is less than the distance between the second wire 46 and the second pin 49, the first pin 48 contacts the first wire 45 earlier than the second pin 49 contacts the second wire 46. Therefore, the first contact location 45a initially receives a lateral force and is stressed more than the other wires. This breaks the first wire 45 prior to the other wires 46, 47. Next, since the second wire 46 is deformed by a greater amount than the third wire 47 by the second pin 49, the second wire 46 receives a greater stress. This breaks the second wire 46. Finally, the third wire 47 receives all the load. Since the third wire 47 cannot withstand the load, the third wire 47 is immediately broken.

The mechanism of FIG. 8 has the same advantages as that of FIGS. 1 to 7 and allows the value of a load torque at which the wires break to approach the normal torque. Further, when the load torque exceeds the predetermined value, the wires 45, 46, 47 immediately break consecutively. The times at which the wires, or power transmission members, break are controlled by adjusting the diameters of the transmission members, the distances between the transmission members and the associated breakage promoters and the location of the breakage promoters. These adjustments allow the power transmission members to break in a desirable order. When coupling the power source and the driven rotor by multiple power transmission members, it is preferable to locate the transmission members at equal angular intervals.

The pins, or the breakage promoters, in the illustrated embodiments have circular cross-sections. However, the pins may have wedge-like cross-section with a cutting edge. This construction allows the pins to break the power transmission members more quickly than a pin having a circular cross-section.

The torque limiting mechanisms of the illustrated embodiments are used with a clutchless type compressor. However, the torque limiting mechanisms may be used with other on-vehicle accessories such as alternators and hydraulic pumps. Further, the present invention is not limited to torque limiting mechanisms for on-vehicle accessories but may be in any torque limiting application between a power source with a driven apparatus.

Therefore, the present examples and embodiments are to be considered as illustrative and not restrictive and the invention is not to be limited to the details given herein, but may be modified within the scope and equivalence of the appended claims.

What is claimed is:

1. A torque limiting apparatus for transmitting power supplied from a power source to a driven apparatus, comprising:

a drive rotor powered by the power source;

a driven rotor that is driven by the drive rotor under normal conditions, the driven rotor being connected to the driven apparatus such that the driven rotor delivers power to and receives load torque from the driven apparatus;

a plurality of power transmission members joining the driven rotor to the drive rotor, wherein the power transmission members are broken to disconnect the drive rotor from the driven rotor when the load torque of the driven apparatus exceeds a predetermined value; and a breakage promoting member positioned to contact a first one of the power transmission members when the load torque applied between the drive rotor and the driven rotor exceeds the predetermined value causing the drive rotor to rotate relative to the driven rotor, wherein the contact promotes breakage of the first power transmission member.

2. The torque limiting apparatus according to claim 1, wherein each power transmission member is made of metal wire, and wherein the promoting member comprises a pin that extends in a direction perpendicular to the first power transmission member such that the path of the pin and the path of the first power transmission member intersect one another when the rotors rotate.

3. The torque limiting apparatus according to claim 1, wherein the promoting member projects from the drive rotor.

4. The torque limiting apparatus according to claim 1, wherein the promoting member is located in proximity to and apart from the first power transmission member by a predetermined distance.

5. The torque limiting apparatus according to claim 1, wherein the drive rotor has an inner surface and the driven rotor has an outer surface spaced from the inner surface by a certain distance, wherein the promoting member is located at a predetermined position between the inner surface and the outer surface.

6. The torque limiting apparatus according to claim 2, wherein the power transmission members extend in a radial direction with respect to the rotors.

7. A torque limiting apparatus for transmitting power supplied from a power source to a driven apparatus, comprising:

a drive rotor powered by the power source;

a driven rotor that is driven by the drive rotor under normal conditions, the driven rotor being connected to the driven apparatus such that the driven rotor delivers power to and receives load torque from the driven apparatus;

a plurality of power transmission members joining the driven rotor to the drive rotor, wherein the power transmission members are broken consecutively to disconnect the drive rotor from the driven rotor when the load torque of the driven apparatus exceeds a predetermined value; and a breakage promoting member fixed to the drive rotor, wherein the promoting member has a path of rotation that intersects that of a first one of the power transmission members and is positioned to contact the first power transmission member when the load torque applied between the drive rotor and the driven rotor exceeds the predetermined value causing the drive rotor to rotate relative to the driven rotor, wherein the contact places additional stress on the first power transmission member thus promoting breakage of the first power transmission member.

8. The torque limiting apparatus according to claim 7, wherein each power transmission member is made of metal wire, and wherein the promoting member comprises a pin that extends in a direction that is transverse to the longitudinal axis of the first power transmission member.

9. The torque limiting apparatus according to claim 7, wherein the drive rotor is separated by a predetermined distance to form a space, and wherein the power transmission members bridge the space and the pin is located within the space.

10. A torque limiting apparatus applied to a compressor having a housing, a rotary shaft rotatably supported by the housing, a power source for supplying power to the rotary shaft, a cam plate tiltably mounted on and rotated by the rotary shaft, a hinge mechanism for connecting the cam plate to the rotary shaft, and a piston located in a cylinder bore formed in the housing, wherein the compressor performs suction, compression and discharge of a refrigerant gas in accordance with reciprocation of the piston, wherein the piston is reciprocated by the cam plate, the torque limiting apparatus comprising:

a drive rotor rotatably supported by the housing, the drive rotor being powered by the power source;

a plurality of power transmission members joined to the drive rotor for transmitting power from the drive rotor to the rotary shaft, wherein the power transmission members are broken to disconnect the drive rotor from the rotary shaft when the load torque of the driven apparatus exceeds a predetermined value; and a breakage promoting member positioned to contact a first one of the power transmission members when the load torque applied between the drive rotor and the rotary shaft exceeds the predetermined value causing the drive rotor to rotate relative to the rotary shaft, wherein the contact promotes breakage of the first power transmission member.

11. The torque limiting apparatus according to claim 10, wherein each power transmission member is made of metal wire, and wherein the promoting member comprises a pin that extends in a direction perpendicular to the first power transmission member such that the path of the pin and the path of the first power transmission member intersect one another when the drive rotor drives the rotary shaft.

12. The torque limiting apparatus according to claim 10, wherein the promoting member projects from the drive rotor.

13. The torque limiting apparatus according to claim 10, wherein the promoting member is located in proximity to and apart from the first power transmission member by a predetermined distance.

14. The torque limiting apparatus according to claim 10, wherein the drive rotor has an inner surface, and an outer surface that rotates integrally with the rotary shaft is spaced from the inner surface by a certain distance, wherein the promoting member is located at a predetermined position between the inner surface and the outer surface.

15. The torque limiting apparatus according to claim 11, wherein the power transmission members extend in a radial direction with respect to the rotary shaft.

16. The torque limiting apparatus according to claim 10, wherein the compressor further comprises:

a sleeve that projects outward from the housing coaxially surrounding the rotary shaft; and a bearing mounted coaxially on the sleeve, the drive rotor being supported by the bearing;

an annular space located radially inward of the drive rotor and radially outward of the rotary shaft, and wherein the power transmission members connect the drive rotor to the rotary shaft to span the annular space.

17. The torque limiting apparatus according to claim 16, wherein the drive rotor has an inner annular surface, and wherein a wall and a step surface are formed on the inner annular surface, the step surface being transverse to the axis of the rotary shaft, wherein the promoting member protrudes from the step surface.

* * * * *